US012761373B2

(12) United States Patent
Lee

(10) Patent No.: US 12,761,373 B2
(45) Date of Patent: Oct. 13, 2026

(54) ELECTRONIC DEVICE AND METHOD FOR IDENTIFYING SATELLITE

(71) Applicants: HYUNDAI MOTOR COMPANY, Seoul (KR); KIA CORPORATION, Seoul (KR)

(72) Inventor: Jae Oh Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 198 days.

(21) Appl. No.: 18/734,668

(22) Filed: Jun. 5, 2024

(65) Prior Publication Data

US 2025/0138197 A1 May 1, 2025

(30) Foreign Application Priority Data

Oct. 27, 2023 (KR) ........................ 10-2023-0145799

(51) Int. Cl.
*G01S 19/28* (2010.01)
*G01S 19/22* (2010.01)

(52) U.S. Cl.
CPC .............. *G01S 19/28* (2013.01); *G01S 19/22* (2013.01)

(58) Field of Classification Search
CPC ........... G01S 19/25; G01S 19/28; G01S 19/22
See application file for complete search history.

(56) References Cited

U.S. PATENT DOCUMENTS

| | | | | |
|---|---|---|---|---|
| 2006/0119506 A1* | 6/2006 | Montheard | G01S 19/28 375/150 |
| 2014/0070991 A1 | 3/2014 | Liu et al. | |
| 2014/0221005 A1 | 8/2014 | Marshall et al. | |
| 2017/0033903 A1* | 2/2017 | Xu | H04B 17/336 |
| 2022/0357751 A1* | 11/2022 | Thomson | G05D 1/0234 |
| 2024/0393477 A1* | 11/2024 | Bade | G06T 7/70 |

FOREIGN PATENT DOCUMENTS

KR 2023-0090976 A 6/2023

* cited by examiner

*Primary Examiner* — Cassi J Galt
(74) *Attorney, Agent, or Firm* — MCDONNELL BOEHNEN HULBERT & BERGHOFF LLP

(57) ABSTRACT

An electronic device includes a memory storing computer-executable instructions and at least one processor that accesses the memory and executes the instructions. The at least one processor filters received global navigational satellite system (GNSS) signals to identify valid satellites, based on receiving the GNSS signals, obtains a digital map of a predetermined target area around a reference position, identifies candidate satellites from the valid satellites, based on coordinates obtained by projecting positions of the valid satellites and the reference position in a first direction and the digital map, in a 3D space including the positions of the valid satellites and the reference position, and identifies at least one target satellite meeting a line of sight (LOS) at the reference position, based on coordinates obtained by projecting positions of the candidate satellites and the reference position in a second direction and the digital map.

20 Claims, 9 Drawing Sheets

ELECTRONIC DEVICE AND METHOD FOR IDENTIFYING SATELLITE

CROSS REFERENCE TO RELATED APPLICATIONS

This application claims the benefit of priority to Korean Patent Application No. 10-2023-0145799, filed in the Korean Intellectual Property Office on Oct. 27, 2023, the entire contents of which are incorporated herein by reference.

TECHNICAL FIELD

The present disclosure relates to an electronic device and a method for identifying a satellite, and more particularly, relates to technologies for increasing position recognition performance in a satellite signal occlusion phenomenon.

BACKGROUND

An electronic device may perform various functions in a complex manner. Particularly, portable terminals such as smartphones have been developed to provide users with more convenience while implementing advanced performance. There is a function for recognizing position information of the electronic device and providing a user with the position information among several functions provided by the electronic device.

Various functions provided by the electronic device requires position information. The electronic device may include a positioning means such as a global positioning system (GPS) to provide position information necessary to provide a service. In this regard, the user may obtain position information by means of the electronic device in a city center in which there are various buildings. However, in the operation of obtaining the position information in the city center, position accuracy may deteriorate due to a satellite signal (e.g., GNSS signal) occlusion phenomenon due to a high-rise building, a narrow space, or the like.

To address it, a problem in which a satellite signal is occluded may be solved by recognizing shapes of three-dimensional light detection and ranging (3D LiDAR)-based surrounding buildings and a problem in which a satellite signal is occluded may be solved by recognizing shapes of surrounding buildings by means of calibration of a SkyView camera. However, the above methods have problems in which an additional 3D LiDAR sensor and a camera sensor are required and performance is able to vary with the performance of a lens.

To address such problems, there is a need to develop a technology capable of obtaining a satellite signal by using a digital map.

SUMMARY

The present disclosure has been made to solve the above-mentioned problems occurring in the prior art while advantages achieved by the prior art are maintained intact.

An aspect of the present disclosure provides an electronic device for obtaining valid satellites by means of filtering of GNSS signals to ensure the effectiveness of satellites used for trilateration for obtaining a reference position at which the GNSS signal is received to minimize a GNSS signal occlusion phenomenon which occurs in a city center by means of a low-cost GNSS receiver and a method for identifying a satellite.

Another aspect of the present disclosure provides an electronic device for obtaining candidate satellites based on coordinates obtained by projecting positions of valid satellites and a reference position at which the GNSS signal is received in a first direction and a digital map to obtain satellites in which the GNSS signal is occluded by the wall of the building to identify a GNSS signal occlusion phenomenon of the satellites once more and a method for identifying a satellite.

Another aspect of the present disclosure provides an electronic device for obtaining satellites meeting a line of sight (LOS) based on coordinates obtained by projecting positions of candidate satellites and a reference position at which the GNSS signal is received in a second direction orthogonal to the first direction and a digital map to minimize a GNSS signal occlusion phenomenon which occurs in a city center by means of a low-cost GNSS receiver and simultaneously minimize a navigation guidance error of the vehicle which is operating in the city center and a method for identifying a satellite.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an electronic device may include a memory storing computer-executable instructions and at least one processor that accesses the memory and executes the instructions. The instructions can include filtering received global navigational satellite system (GNSS) signals to identify valid satellites, based on receiving the GNSS signals from a plurality of satellites, obtaining a digital map of a predetermined target area around a reference position at which the GNSS signals are received, identifying candidate satellites from the valid satellites, based on coordinates obtained by projecting positions of the valid satellites and the reference position in a first direction and the digital map, in a three-dimensional (3D) space including the positions of the valid satellites and the reference position, and identifying at least one target satellite meeting a line of sight (LOS) at the reference position, based on coordinates obtained by projecting positions of the candidate satellites and the reference position in a second direction different from the first direction and the digital map, in the 3D space.

In an embodiment, the instructions can include obtaining fault signals based on at least one of a clock delay of each of the GNSS signals, an orbit error, or noise, or any combination thereof and may obtain signals greater than predetermined signal intensity among signals except for the fault signals among the GNSS signals to identify the valid satellites.

In an embodiment, the instructions can include repeatedly identifying the valid satellites, based on a predetermined number for trilateration.

In an embodiment, the instructions can include obtaining at least one of a road network of the target area, a position of at least one building, a shape of the at least one building, a height of the at least one building, or terrain information, or any combination thereof from the digital map.

In an embodiment, the instructions can include obtaining first boundary lines of at least one building included in the target area associated with the first direction and second boundary lines of the at least one building associated with the second direction from the digital map, based on obtaining the digital map of the target area.

In an embodiment, the instructions can include projecting the positions of the valid satellites in the first direction to obtain a first satellite coordinate group, projecting the reference position in the first direction to obtain first reference coordinates, obtaining satellites corresponding to first segments intersecting with the first boundary lines among first segments generated by connecting the first reference coordinates with each of coordinates included in the first satellite coordinate group, and extracting the satellites corresponding to the first segments intersecting with the first boundary lines from the valid satellites to identify the candidate satellites.

In an embodiment, the instructions can include projecting the positions of the candidate satellites in the first direction to obtain a candidate satellite group, connecting the first reference coordinates with each of coordinates included in the candidate satellite group to generate candidate segments, and obtaining a distance between each of intersection coordinates at which the candidate segments and the first boundary lines intersect with each other and the first reference coordinates as a candidate distance of each of the candidate satellites.

In an embodiment, the instructions can include selecting any one of the candidate satellites as a temporary satellite which is a target for determining the LOS, projecting a position of the temporary satellite in the second direction to obtain second satellite coordinates, projecting the reference position in the second direction to obtain second reference coordinates, and obtaining an elevation angle of the temporary satellite, based on coordinates corresponding to the foot of perpendicular drawn on a plane perpendicular to the first direction in the second satellite coordinates, the second satellite coordinates, and the second reference coordinates.

In an embodiment, the instructions can include obtaining a first calculation value, based on a trigonometric function of the candidate distance and the elevation angle of the temporary satellite, identifying at least one intersection coordinates at which a second segment generated by connecting the second reference coordinates with the second satellite coordinates intersect with the second boundary lines, and obtaining a second calculation value capable of indicating a height of the building from the digital map, based on coordinates close to the second reference coordinates among the identified at least one intersection coordinates.

In an embodiment, the instructions can include identifying the temporary satellite as the target satellite, based on the first calculation value and the second calculation value.

According to another aspect of the present disclosure, a method for identifying a satellite may include filtering received global navigational satellite system (GNSS) signals to identify valid satellites, based on receiving the GNSS signals from a plurality of satellites, obtaining a digital map of a predetermined target area around a reference position at which the GNSS signals are received, identifying candidate satellites from the valid satellites, based on coordinates obtained by projecting positions of the valid satellites and the reference position in a first direction and the digital map, in a 3D space including the positions of the valid satellites and the reference position, and identifying at least one target satellite meeting a line of sight (LOS) at the reference position, based on coordinates obtained by projecting positions of the candidate satellites and the reference position in a second direction different from the first direction and the digital map, in the 3D space.

In an embodiment, the identifying of the valid satellites may include obtaining fault signals based on at least one of a clock delay of each of the GNSS signals, an orbit error, or noise, or any combination thereof and obtaining signals greater than predetermined signal intensity among signals except for the fault signals among the GNSS signals to identify the valid satellites.

In an embodiment, the identifying of the valid satellites may include repeatedly performing identifying the valid satellites, based on a predetermined number for trilateration.

In an embodiment, the obtaining of the digital map of the target area may include obtaining at least one of a road network of the target area, a position of at least one building, a shape of the at least one building, a height of the at least one building, or terrain information, or any combination thereof from the digital map.

In an embodiment, the method may further include obtaining first boundary lines of at least one building included in the target area associated with the first direction and second boundary lines of the at least one building associated with the second direction from the digital map, based on obtaining the digital map of the target area.

In an embodiment, the method may further include projecting the positions of the valid satellites in the first direction to obtain a first satellite coordinate group, projecting the reference position in the first direction to obtain first reference coordinates, obtaining satellites corresponding to first segments intersecting with the first boundary lines among first segments generated by connecting the first reference coordinates with each of coordinates included in the first satellite coordinate group, and extracting the satellites corresponding to the first segments intersecting with the first boundary lines from the valid satellites to identify the candidate satellites.

In an embodiment, the method may further include projecting the positions of the candidate satellites in the first direction to obtain a candidate satellite group, connecting the first reference coordinates with each of coordinates included in the candidate satellite group to generate candidate segments, and obtaining a distance between each of intersection coordinates at which the candidate segments and the first boundary lines intersect with each other and the first reference coordinates as a candidate distance of each of the candidate satellites.

In an embodiment, the method may further include selecting any one of the candidate satellites as a temporary satellite which is a target for determining the LOS, projecting a position of the temporary satellite in the second direction to obtain second satellite coordinates, projecting the reference position in the second direction to obtain second reference coordinates, and obtaining an elevation angle of the temporary satellite, based on coordinates corresponding to the foot of perpendicular drawn on a plane perpendicular to the first direction in the second satellite coordinates, the second satellite coordinates, and the second reference coordinates.

In an embodiment, the method may further include obtaining a first calculation value, based on a trigonometric function of the candidate distance and the elevation angle of the temporary satellite, identifying at least one intersection coordinates at which a second segment generated by connecting the second reference coordinates with the second satellite coordinates intersect with the second boundary lines, and obtaining a second calculation value capable of indicating a height of the building from the digital map, based on coordinates close to the second reference coordinates among the identified at least one intersection coordinates.

In an embodiment, the method may further include identifying the temporary satellite as the target satellite, based on the first calculation value and the second calculation value.

BRIEF DESCRIPTION OF THE FIGURES

The above and other objects, features and advantages of the present disclosure will be more apparent from the following detailed description taken in conjunction with the accompanying drawings.

Figure 1:
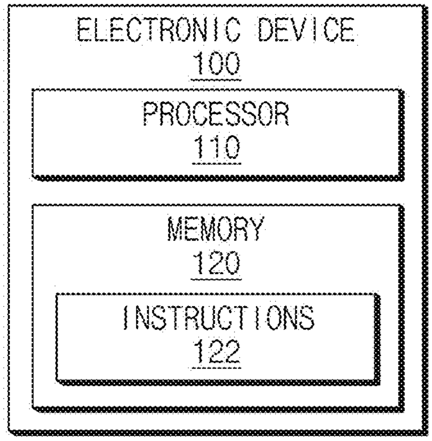
FIG. 1 is a drawing illustrating an electronic device according to an embodiment of the present disclosure.

With regard to description of drawings, the same or similar denotations may be used for the same or similar components.

DETAILED DESCRIPTION

Hereinafter, some embodiments of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure. Hereinafter, various embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application. For example, the terms, such as "first", "second", "1st", "2nd", or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It will be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. Terms used in the present disclosure are used to only describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person skilled in the art described in the present disclosure. It will be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, embodiments of the present disclosure will be described in detail with reference to FIGS. 1 to 9.

FIG. 1 is a drawing illustrating an electronic device according to an embodiment of the present disclosure.

An electronic device 100 according to an embodiment may include a processor 110 and a memory 120 including instructions 122.

The electronic device 100 may indicate a device for identifying a target satellite meeting a line of sight (LOS) based on a digital map. For example, the electronic device 100 may receive global navigational satellite system (GNSS) signals from a plurality of satellites. The electronic device 100 may filter the received GNSS signals. In detail, the electronic device 100 may filter the received GNSS signals to identify valid satellites among the plurality of satellites. The electronic device 100 may identify candidate satellites among the valid satellites, using the digital map, and may also identify a target satellite among the candidate satellites.

The digital map may be a database including data indicating nodes, which are road intersections, and roads among the intersection points and indicating links among the nodes. In detail, the links may be divided into segments limited by a start node and an end node. The nodes may be "real" in that they indicate a minimum of 3 links or road intersection points at which segments intersect with each other. Alternatively, the nodes may be "artificial" in that they are provided as anchors for segments which are not limited at one end or both ends by an actual node to provide some characteristics of road changes along the road, for example, a means for identifying a position at which the speed limit changes or shape information for a special one branch road of the road. As a result, the digital map may include pieces of information of a building which is located in the city center, based on the nodes and the links. For example, the digital map may include boundary lines of the building and may specifically include at least one of a road network, a position of the building, a shape of the building, a height of the building, or terrain information, or any combination thereof.

The LOS may be described as a path in which there is no external object (e.g., building) in a data transmission path between the electronic device 100 and an external electronic device (e.g., a satellite for transmitting a GNSS signal). For example, the LOS may be defined as a path in which the electronic device 100 and the external electronic device are able to be connected with each other by a virtual straight line. Otherwise, non-line of sight (NLOS) may be a path in which the electronic device 100 and the external electronic device are unable to be connected with each other by the virtual straight line, that is, may be defined as a path in which the electronic device 100 and the external electronic device are able to be connected with each other by virtual multiple paths. Therefore, for convenience of description in the specification, the external electronic device meeting the LOS may be described as an electronic device which may perform data transmission to an LOS path with the electronic device 100. For example, the target satellite meeting the LOS may indicate a satellite which may perform data transmission (i.e., transmission of a GNSS signal) to the LOS path with the electronic device 100.

Although the navigation satellite system includes an area and augmentation system (i.e., a system which is not truly "global"), the GNSS may be used as a general term of the system. For example, the GNSS signal may include a mobile wireless signal (e.g., GLONASS L1, L2 ICD) of an IS-GPS-800D (Sep. 24, 2013) world navigation satellite system for describing being responsible for global positioning system engineering and integration-interface specifications IS-GPS-200H (e.g., Sept GPS L1 C/A, L2C and P channel/code) and GPS L1C channel/code (IS-GPS-800), a signal of European GNSS (Galileo) open service-space interface control document (e.g., Galileo OS-SIS-ICD), a signal (e.g., BeiDou ICD) of BeiDou navigation satellite system-space interface control document, and an ICD signal in a space for quasi-zenith satellite system-interface specifications-satellite positioning, navigation, and timing service (e.g., IS-QZSS-PNT-001), and Indian regional navigation satellite system-standard positioning service (e.g., ISRO-IRNSS-ICD-SPS-1.1).

The operation of filtering the GNSS signals may include an operation of identifying whether a fault signal is included in the received signal and an operation of identifying intensity of the received signal. For example, the electronic device 100 may identify and/or obtain fault signals based on at least one of a clock delay of a GNSS signal, an orbit error, or noise, or any combination thereof. Herein, when the received GNSS signal includes the fault signal, the electronic device 100 may fail to use the GNSS signal. Furthermore, the electronic device 100 may identify whether the intensity of the GNSS signal is greater than predetermined intensity. In detail, when the intensity of the GNSS signal is greater than 35 dB, the electronic device 100 may use the GNSS signal for an operation of identifying a target satellite. However, the predetermined intensity is described as, but not limited to, 35 dB for convenience of description.

The valid satellites may indicate satellites to which the above-mentioned filtering operation is applied among satellites which perform data transmission with the electronic device 100. For example, the valid satellites may include satellites in which there is no fault signal in the GNSS signal, data transmission of which is performed with the electronic device 100, and in which the intensity of the GNSS signal is greater than 35 dB.

The candidate satellites may include satellites which do not meet the LOS among the valid satellites, in a space (e.g., a two-dimensional (2D) space) represented by the digital map. For example, the electronic device 100 may represent positions and coordinates of the valid satellites on a first plane. The electronic device 100 may identify satellites which do not meet the LOS among the valid satellites, based on the positions of the valid satellites, which are represented on the first plane, a reference position at which the GNSS signal is received, and positions of buildings included in the digital map. Herein, the electronic device 100 may identify satellites, which does not meet the LOS, among the valid satellites as candidate satellites. For reference, the first plane may be a plane capable of being represented on the basis of a first direction in a three-dimensional (3D) space in which there are the electronic device 100 and valid satellites.

The target satellite may include a satellite meeting the LOS among the candidate satellites, in the space represented by the digital map. For example, the electronic device 100 may represent positions and coordinates of the candidate satellites on a second plane. The electronic device 100 may identify a satellite meeting the LOS among the candidate satellites, based on the positions of the candidate satellites, which are represented on the second plane, the reference position at which the GNSS signal is received, and the positions of the buildings included in the digital map. Herein, the electronic device 100 may identify a satellite meeting the LOS among the candidate satellites as a target satellite. For reference, the second plane may be a plane different from the first plane, which may be a plane capable of being represented on the basis of a second direction perpendicular and orthogonal to the first direction in the 3D space in which there are the electronic device 100 and candidate satellites.

The electronic device 100 may identify the target satellite through the above-mentioned operations, thus identifying satellites in which there is a satellite signal occlusion phenomenon, in a city center, in which high-rise buildings are located, including a narrow road. Furthermore, the electronic device 100 may quickly identify the satellites in which there is the satellite signal occlusion phenomenon, in a situation in which there is no LiDAR sensor or separate camera sensor.

The processor 110 may execute software and may control at least one other component (e.g., a hardware or software component) connected with the processor 110. In addition, the processor 110 may perform a variety of data processing or calculation. For example, the processor 110 may store a GNSS signal, a reference position, information of the valid satellite, information of the candidate satellite, and information of the target satellite in the memory 120.

For reference, the processor 110 may perform all operations performed by the electronic device 100. Therefore, for convenience of description in the specification, the operation performed by the electronic device 100 is mainly described as an operation performed by the processor 110. Furthermore, for convenience of description in the specification, the processor 110 is mainly described as, but not limited to, one processor. For example, the electronic device 100 may include at least one processor. Each of the at least one processor may perform all operations associated with an operation of identifying a target satellite.

The memory 120 may temporarily and/or permanently store various pieces of data and/or information required to perform the operation of identifying the target satellite. For example, the memory 120 may store the GNSS signal, the reference position, the information of the valid satellite, the information of the candidate satellite, and the information of the target satellite.

Figure 2:
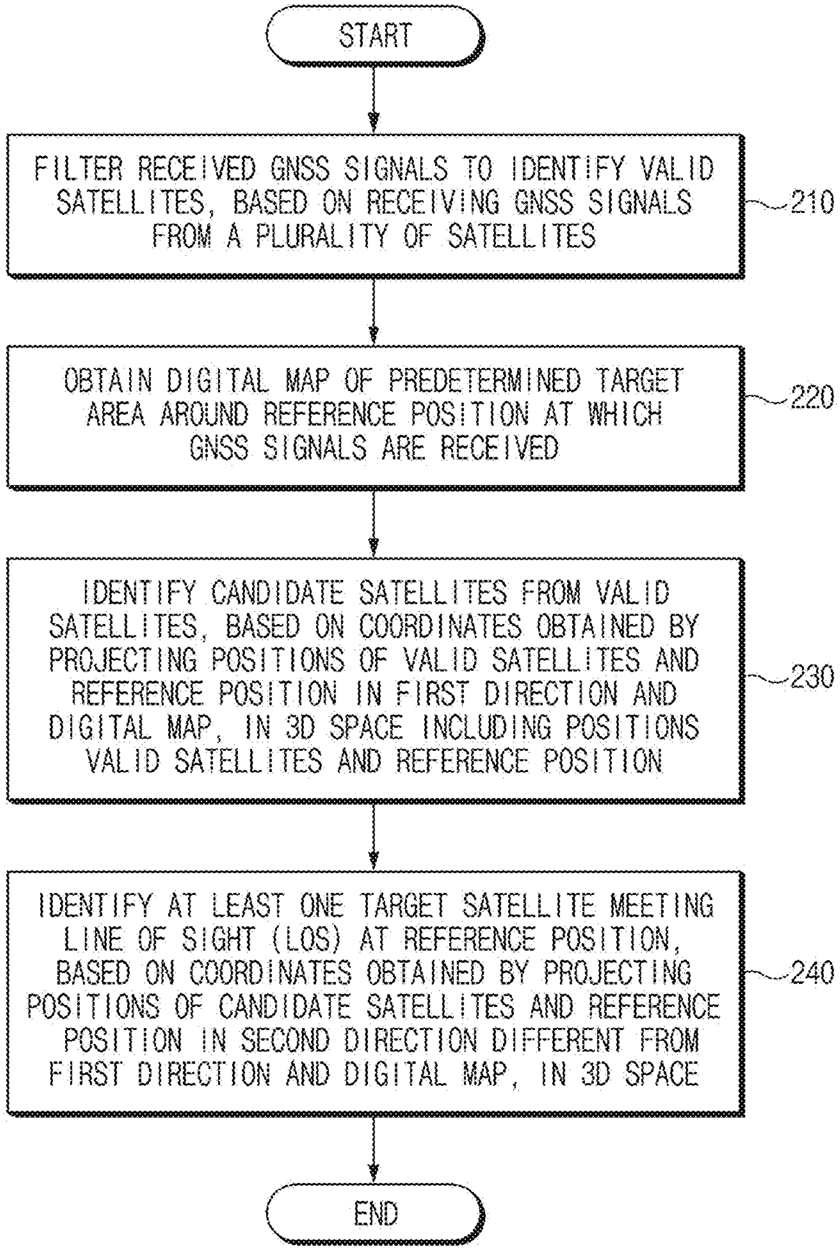
FIG. 2 is a flowchart for describing a method for identifying a target satellite meeting a line of sight (LOS), in an electronic device according to an embodiment of the present disclosure.

FIG. 2 is a flowchart for describing a method for identifying a target satellite meeting a line of sight (LOS), in an electronic device according to an embodiment of the present disclosure.

In operation 210, an electronic device (e.g., an electronic device 100 of FIG. 1) according to an embodiment may filter received GNSS signals to identify valid satellites, based on receiving the GNSS signals from a plurality of satellites. For example, the electronic device may obtain fault signals based on at least one of a clock delay of each of the GNSS signals, an orbit error, or noise, or any combination thereof and may obtain signals which are greater than predetermined signal intensity among signals except for the fault signals among the GNSS signals, thus identifying valid satellites. Furthermore, the electronic device may repeatedly perform an operation of identifying a valid satellite, based on a predetermined number for trilateration. In detail, when the number of valid satellites is greater than or equal to at least four, the electronic device may stop the operation of identifying the valid satellite.

In operation 220, the electronic device may obtain a digital map of a predetermined target area around a reference position at which the GNSS signals are received. The electronic device may identify a candidate satellite and a target satellite from the valid satellites by means of the obtained digital map. In other words, the electronic device may fail to require a LiDAR sensor and a camera sensor to identify whether satellites meet the LOS and may identify whether the satellites meet the LOS, by simply using a boundary line of a building obtained by means of the digital map. To this end, the electronic device may obtain the digital map from an external server, before performing the following operations. For reference, the target area may include all areas between the reference position and a point which is located at a predetermined distance (i.e., a radius). Therefore, the target area may be represented as a circle on the digital map. A detailed description associated with it will be given below with reference to FIG. 4.

In operation 230, the electronic device may identify candidate satellites from the valid satellites, based on coordinates obtained by projecting positions of the valid satellites and the reference position in a first direction and the digital map, in a 3D space including the positions of the valid satellites and the reference position. For example, the electronic device may perform coordinate conversion of the positions of the valid satellites and the reference position, which are represented in the 3D space. In detail, the electronic device may set a direction facing the reference position from the positions of the valid satellites to the first direction. In other words, the first direction may be a direction facing the reference position from the positions of the valid satellites. The electronic device may project the positions of the valid satellites and the reference position in the 3D space onto a first plane in the first direction to obtain converted coordinates (e.g., coordinates of the valid satellites and coordinates of the reference position). The electronic device may identify candidate satellites from the valid satellites, based on the converted coordinates and the digital map. A detailed description associated with it will be given below with reference to FIG. 5.

In operation 240, the electronic device may identify at least one target satellite meeting the LOS at the reference position, based on the coordinates obtained by projecting positions of the candidate satellites and the reference position in a second direction different from the first direction and the digital map, in the 3D space. For example, the electronic device may perform coordinate conversion (e.g., which is different from the coordinate conversion performed in operation 230) of the positions of the candidate satellites and the reference position, which are capable of being represented in the 3D space. In detail, the electronic device may set a direction orthogonal to the first direction facing the reference position from the positions of the valid satellites to the second direction. In other words, the second direction may be a direction facing the positions of the candidate satellites and the reference position at the same time. The electronic device may project the positions of the candidate satellites and the reference position in the 3D space onto a second plane in the second direction to obtain converted coordinates (e.g., coordinates of the candidate satellites and coordinates of the reference position). The electronic device may identify a target satellite from the candidate satellites, based on the converted coordinates and the digital map. A detailed description associated with it will be given below with reference to FIG. 6.

Figure 3:
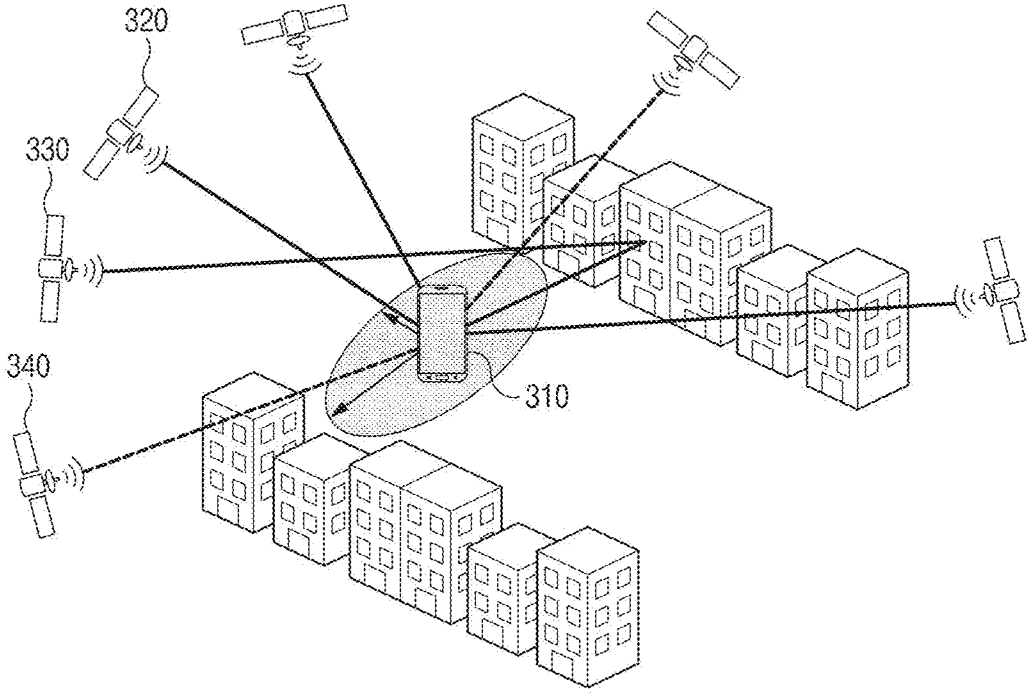
FIG. 3 is a drawing illustrating a global navigational satellite system (GNSS) signal occlusion phenomenon, in an electronic device according to an embodiment of the present disclosure.

FIG. 3 is a drawing illustrating a global navigational satellite system (GNSS) signal occlusion phenomenon, in an electronic device according to an embodiment of the present disclosure.

An electronic device 310 according to an embodiment may attempt to transmit and receive data with each of a first satellite 320, a second satellite 330, and a third satellite 340. However, the electronic device 310 may fail to transmit and receive data through a path capable of being connected with each of the first satellite 320, the second satellite 330, and the third satellite 340 by a virtual straight line.

The first satellite 320 may transmit and receive data through a path capable of being connected with the electronic device 310 by a virtual straight line. In this case, the first satellite 320 may be a satellite which meets an LOS on the basis of the electronic device 310.

The second satellite 330 may fail to transmit and receive data through a path capable of being connected with the electronic device 310 by a virtual straight line. However, the second satellite 330 may transmit and receive data through a path capable of being connected with the electronic device 310 by virtual multiple lines. In this case, the second satellite 330 may be a satellite which does not meet the LOS, that is, meets NLOS, on the basis of the electronic device 310.

The third satellite 340 may fail to transmit and receive data through a path capable of being connected with the electronic device 310 by a virtual straight line and a path capable of being connected with the electronic device 310 by virtual multiple paths. Because a building in a city center is located in a space between the third satellite 340 and the electronic device 310, the third satellite 340 may fail to transmit and receive data with the electronic device 310. In this case, the third satellite 340 may be a satellite blocked (i.e., a signal blocked), which does not meet the LOS and does not meet the NLOS, on the basis of the electronic device 310.

Figure 4:
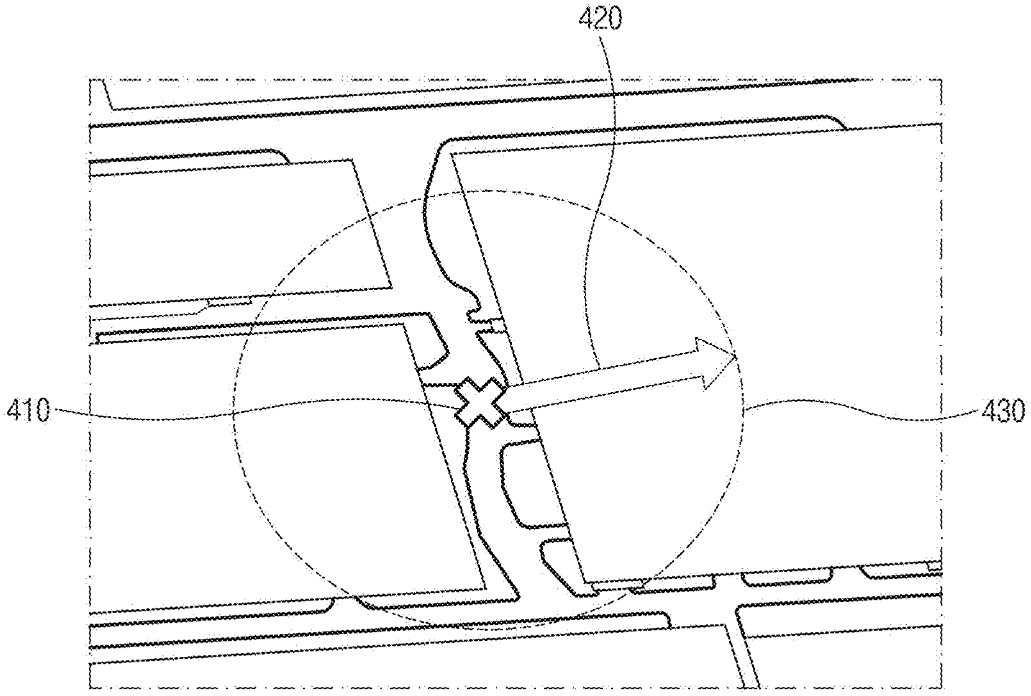
FIG. 4 is a drawing illustrating a method for obtaining a digital map of a target area, in an electronic device according to an embodiment of the present disclosure.

FIG. 4 is a drawing illustrating a method for obtaining a digital map of a target area, in an electronic device according to an embodiment of the present disclosure.

An electronic device (e.g., an electronic device 100 of FIG. 1) according to an embodiment may obtain a digital map of a target area 430 including all targets on a road to a predetermined distance 420 around a reference position 410 at which GNSS signals are received.

The reference position 410 may be a position of a GNSS receiver which receives GNSS signals and may be specifically a position of the electronic device. Such a reference position 410 may be located on a road on which a vehicle is operating and may be located in a building. Therefore, for convenience of description in the specification, the reference position 410 is described as a position of the GNSS receiver included in the vehicle located on the road. Furthermore, as described above with reference to FIG. 2, the reference position 410 may be determined as, but not particularly limited to, a point at which GNSS signals transmitted by at least three satellites interact with each other.

The digital map of the target area 430 may include all targets on the road to the predetermined distance 420 around the reference position 410. For example, the digital map of the target area 430 may include at least one of a road network, a position of a building, a shape of the building, a height of the building, or terrain information, or any combination thereof. Although described below, the digital map of the target area 430 may be used for an operation of identifying candidate satellites and a target satellite in the electronic device.

The electronic device may obtain first boundary lines of at least one building included in a target area associated with a first direction and second boundary lines of the at least one building associated with a second direction from the digital map, based on obtaining the digital map of the target area. In detail, the first boundary lines may include lines which are in contact with the ground of the at least one building. Otherwise, the second boundary lines may include lines which are not in contact with the ground of the at least one building. A detailed description of the first boundary lines will be described below with reference to FIG. 5. A detailed description of the second boundary lines will be described below with reference to FIG. 6.

Figure 5:
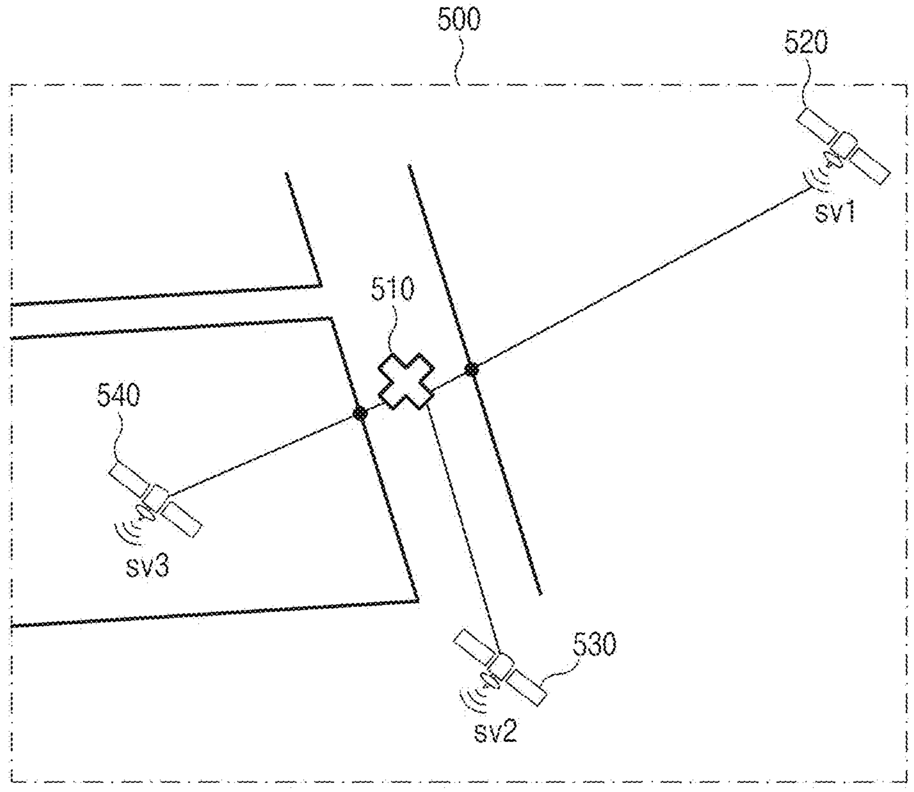
FIG. 5 is a drawing illustrating a method for identifying candidate satellites from valid satellites, in an electronic device according to an embodiment of the present disclosure.

FIG. 5 is a drawing illustrating a method for identifying candidate satellites from valid satellites, in an electronic device according to an embodiment of the present disclosure.

An electronic device (e.g., an electronic device 100 of FIG. 1) according to an embodiment may identify candidate satellites from valid satellites, based on coordinates obtained by projecting positions of the valid satellites and a reference position in a first direction and a digital map, in a 3D space including the positions of the valid satellites and the reference position.

The electronic device may project the positions of the valid satellites and the reference position, which are capable of being represented in the 3D space, onto a first plane 500 in the first direction to obtain a first satellite coordinate group (e.g., including coordinates 520 of a first converted valid satellite, coordinates 530 of a second converted valid satellite, and coordinates 540 of a third converted valid satellite) and first reference coordinates 510 which are coordinates of a converted reference position.

The electronic device may identify the candidate satellites from the valid satellites, based on the first satellite coordinate group, the first reference coordinates 510, and a digital map (e.g., a digital map of FIG. 4). In detail, the electronic device may determine whether first boundary lines obtained from the digital map and a segment connecting the first reference coordinates 510 of the converted reference position with the coordinates of the converted valid satellites intersect with each other.

In detail, the electronic device may obtain satellites corresponding to first segments intersecting with the first boundary lines among first segments generated by connecting the first reference coordinates 510 with each of coordinates included in the first satellite coordinate group. For example, the first segment generated by connecting coordinates 520 of the first converted valid satellite with the first reference coordinates 510 may be a segment intersecting with the first boundary lines. In this case, a satellite corresponding to the coordinates 520 of the first converted valid satellite may be extracted by the electronic device. The first segment generated by connecting the coordinates 530 of the second converted valid satellite with the first reference coordinates 510 may be a segment which does not intersect with the first boundary lines. In this case, a satellite corresponding to the coordinates 530 of the second converted valid satellite may fail to be extracted by the electronic device. The first segment generated by connecting the coordinates 540 of the third converted valid satellite with the first reference coordinates 510 may be a segment intersecting with the first boundary lines. In this case, a satellite corresponding to the coordinates 540 of the third converted valid satellite may be extracted by the electronic device.

The electronic device may extract the satellites corresponding to the first segments intersecting with the first boundary lines from the valid satellites, thus identifying the valid satellites. For example, as shown in FIG. 5, the candidate satellites may include a satellite corresponding to the coordinates 520 of the first converted valid satellite and a satellite corresponding to the coordinates 540 of the third converted valid satellite.

The electronic device may obtain a candidate distance of each of satellites included in the candidate satellites. Herein, the candidate distance may indicate a distance from a reference position before being projected onto the first reference coordinates 510 to the first boundary line. For example, the electronic device may project positions of candidate satellites to obtain a candidate satellite group, in the first direction. The electronic device may connect the first reference coordinates 510 with each of coordinates included in the candidate satellite group to generate candidate segments. The electronic device may obtain a distance between each of intersection coordinates at which the candidate segments and the first boundary lines intersect with each other and the first reference coordinates 510 as a candidate distance of each of the candidate satellites. Herein, the obtained candidate distance may be used for an operation of identifying a target satellite, which will be described below.

Figure 6:
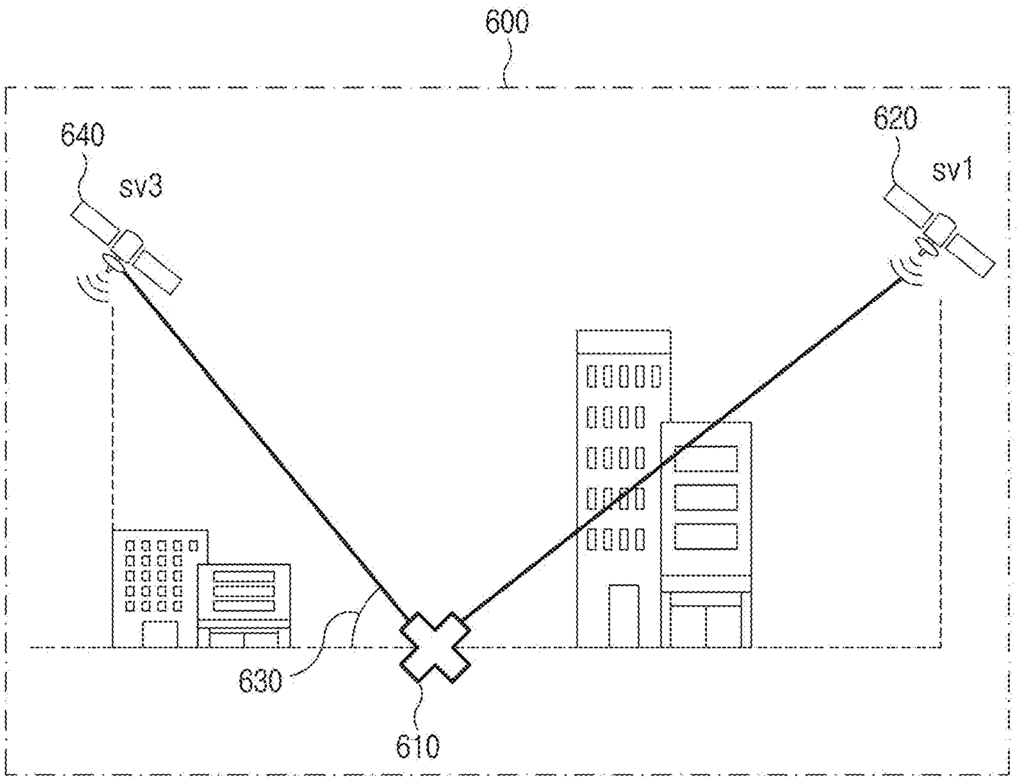
FIG. 6 is a drawing illustrating a method for identifying a target satellite from candidate satellites, in an electronic device according to an embodiment of the present disclosure.

FIG. 6 is a drawing illustrating a method for identifying a target satellite from candidate satellites, in an electronic device according to an embodiment of the present disclosure.

An electronic device (e.g., an electronic device 100 of FIG. 1) according to an embodiment may identify at least one target satellite meeting an LOS at a reference position, based on coordinates obtained by projecting positions of candidate satellites and a reference position in a second direction and a digital map, in a 3D space.

The electronic device may project the positions of the candidate satellites and the reference position, which are capable of being represented in the 3D space, onto a second plane 600 in the second direction to obtain second satellite coordinates and second reference coordinates 610 which are coordinates of a converted reference position. However, it is not limited thereto. The electronic device may select any one of the candidate satellites as a temporary satellite which is a target for determining the LOS. The electronic device may project a position of the temporary satellite in the second direction to obtain the second satellite coordinates and may project the reference position in the second direction to obtain the second reference coordinates 610. Therefore, for convenience of description in the specification, it is described to perform an operation of whether each of satellites included in the candidate satellites is able to be identified as a target satellite.

The electronic device may select an sv1 satellite 620 among the candidate satellites as a temporary satellite. The electronic device may obtain an elevation angle of the temporary satellite, based on the second satellite coordinates obtained by projecting the position of the temporary satellite in the second direction, the second reference coordinates 610 obtained by projecting the reference position in the second direction, and coordinates corresponding to the foot of perpendicular drawn on a plane (e.g., a horizontal plane) perpendicular to the first direction at the second satellite coordinates. In detail, when the temporary satellite is an sv3 satellite 640, the elevation angle of the temporary satellite may be an angle 630.

The electronic device may obtain a first calculation value, based on a trigonometric function of the candidate distance and the elevation angle of the temporary satellite. The first calculation value may be represented by Equation 1 below.

$$\text{dist}\times\tan(\text{elevation angle}) \qquad \text{Equation 1:}$$

Herein, dist may refer to the candidate distance of the temporary satellite, tan may refer to the trigonometric function, and the elevation angle may refer to the elevation angle of the temporary satellite.

By means of Equation 1 above, the electronic device may obtain a value about a comparison height capable of including the candidate distance of the temporary satellite and the elevation angle of the temporary satellite. Herein, the comparison height may be a target of comparison with a second calculation value obtained below.

The electronic device may identify at least one intersection coordinates at which a second segment generated by connecting the second reference coordinates 610 with the second satellite coordinates intersect with the second boundary lines. For example, the electronic device may obtain the second calculation value capable of indicating a height of a building from the digital map, based on coordinates close to the second reference coordinates 610 among the identified at least one intersection coordinates. The method for obtaining the second calculation value will be described in detail below with reference to FIG. 7.

The electronic device may identify the temporary satellite as a target satellite, based on the first calculation value and the second calculation value. The condition for identifying the temporary satellite as the target satellite may be represented by Equation 2 below.

$$\text{dist}\times\tan(\text{elevation angle})\geq\text{building height} \qquad \text{Equation 2:}$$

Herein, dist×tan(elevation angle) may refer to the first calculation value, and the building height may refer to the second calculation value.

The electronic device may identify the temporary satellite meeting Equation 2 above as the target satellite. In detail, the temporary satellite may be a satellite determined as NLOS, in a first plane onto which positions are projected in the first direction. However, the temporary satellite may be a satellite capable of being redetermined as an LOS by Equations 1 and 2 above, in the second plane onto which positions are projected in the second direction.

The electronic device may perform operations described with reference to FIGS. 1 to 6, based on Equation 3 below. In other words, Equation 3 below may include targets in which operations of the electronic device according to an embodiment are represented by an equation. For example, Equation 3 below may be represented as follows.

$$f_{LOS}\{f_{CAND}(x^{LLH},SV^{LLH}f_{MAP}(x^{LLH},r))\} \qquad \text{Equation 3:}$$

Herein, $f_{MAP}(x^{LLH},r)$ may refer to the operation of obtaining the digital map of the predetermined target area around the reference position at which the GNSS signals are received, $f_{CAND}(x^{LLH},SV^{LLH},f_{MAP}(x^{LLH},r))$ may refer to the operation of identifying the candidate satellite based on the positions of the valid satellites, the reference position, and the digital map, and $f_{LOS}$ may refer to the operation of identifying the target satellite based on the positions of the candidate satellites, the reference position, and the digital map.

Figure 7:
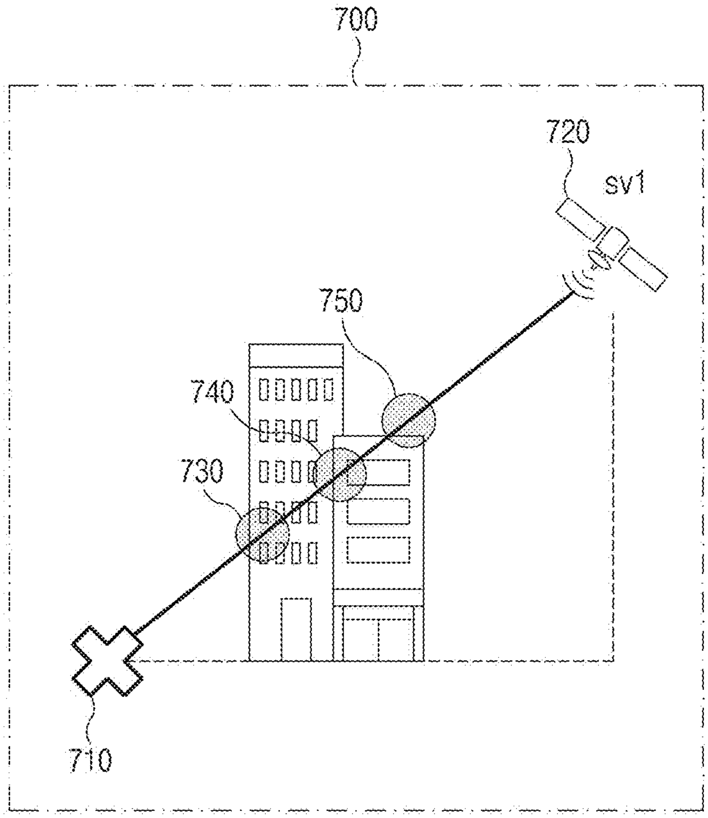
FIG. 7 is a drawing illustrating a detailed method for identifying a target satellite, in an electronic device according to an embodiment of the present disclosure.

FIG. 7 is a drawing illustrating a detailed method for identifying a target satellite, in an electronic device according to an embodiment of the present disclosure.

An electronic device (e.g., an electronic device 100 of FIG. 1) according to an embodiment may obtain coordinates closest to second reference coordinates 710 among intersection coordinates of a plane 700 perpendicular to a first direction, thus obtaining a second calculation value.

The electronic device may identify at least one intersection coordinates at which a second segment generated by connecting the second reference coordinates 710 with second satellite coordinates 720 intersect with second boundary lines (i.e., boundary lines of each of buildings shown in FIG. 7). Herein, the at least one intersection coordinates may include first intersection coordinates 730, second intersection coordinates 740, and third intersection coordinates 750. The electronic device may obtain the first intersection coordinates 730, which are coordinates close to the second reference coordinates 710, among the identified at least one intersection coordinates.

The electronic device may obtain the second calculation value capable of indicating a height of a building from a digital map, based on the first intersection coordinates 730 which are coordinates close to the second reference coordinates 710. For example, a distance between the second reference coordinates 710 and coordinates corresponding to the foot of perpendicular drawn from the first intersection coordinates 730 to the plane 700 may be a candidate distance. A distance between the first intersection coordinates 730 and the coordinates corresponding to the foot of perpendicular drawn from the first intersection coordinates 730 to the plane 700 may be the second calculation value capable of indicating the height of the building. As a result, the electronic device may identify a temporary satellite as a target satellite, based on the first calculation value and the second calculation value.

Figure 8:
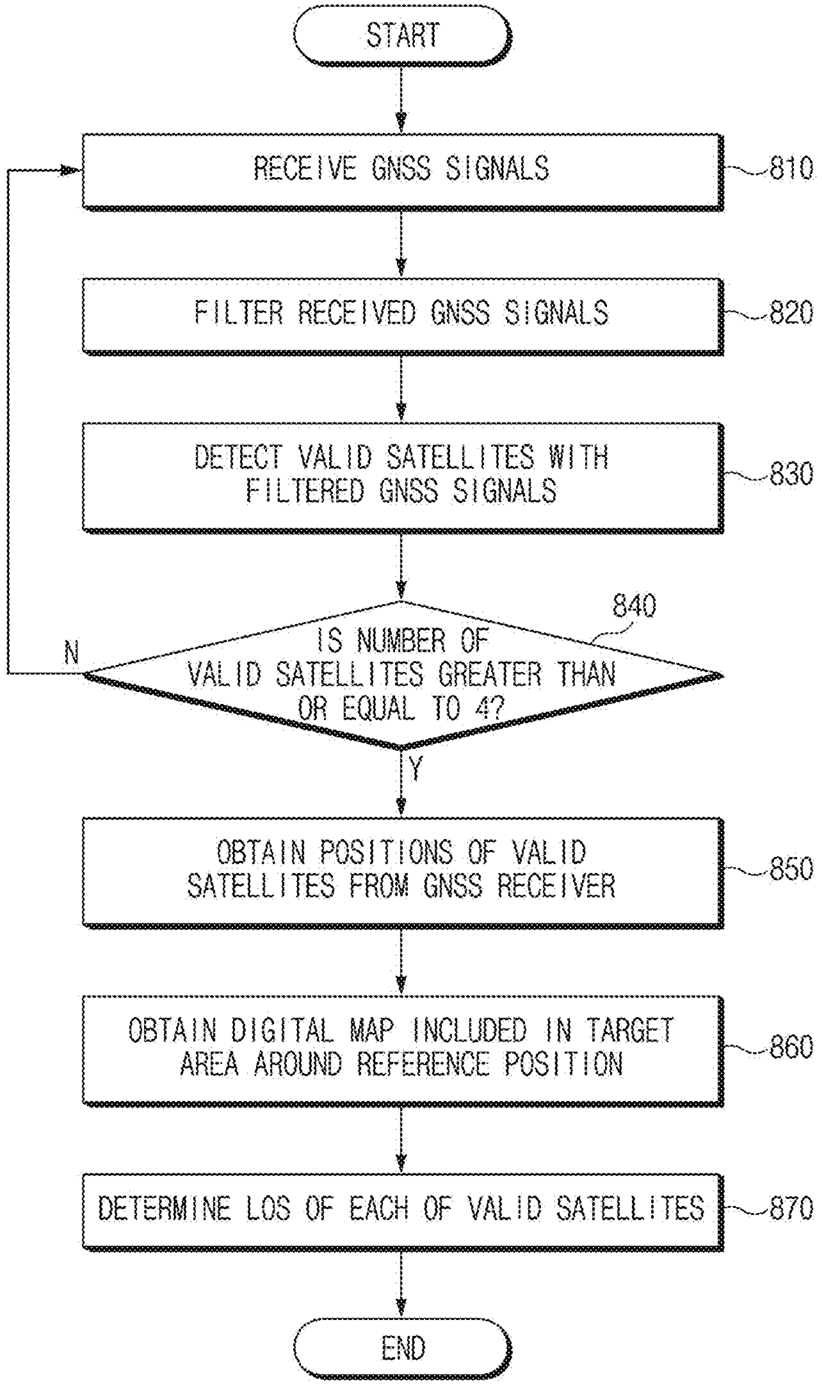
FIG. 8 is a flowchart for specifically describing a method for identifying a target satellite meeting an LOS, in an electronic device according to an embodiment of the present disclosure.

FIG. 8 is a flowchart for specifically describing a method for identifying a target satellite meeting an LOS, in an electronic device according to an embodiment of the present disclosure.

In operation 810, an electronic device (e.g., an electronic device 100 of FIG. 1) according to an embodiment may receive GNSS signals from a plurality of satellites. For example, the electronic device may receive the GNSS signals from the plurality of satellites through a GNSS receiver. Herein, the GNSS signals may be received through a path in which a reference position at which the GNSS signals are received and a satellite are able to be connected with each other by virtual multiple paths, as well as a path in which the reference position at which the GNSS signals are received and the satellite are able to be connected with each other by a virtual straight line.

In operation 820, the electronic device may filter the received GNSS signals. For example, the electronic device may obtain fault signals based on at least one of a clock delay of each of the GNSS signals, an orbit error, or noise, or any combination thereof and may obtain signals which are greater than predetermined signal intensity among signals except for the fault signals among the received GNSS signals, thus filtering the received GNSS signals.

In operations 830 and 840, the electronic device may identify valid satellites with the filtered GNSS signals. For example, the electronic device may repeatedly perform the operation of identifying valid satellites, based on a predetermined number (e.g., 4) for trilateration.

In operation 850, the electronic device may obtain positions of the valid satellites from the GNSS receiver, based on that the number of the valid satellites is greater than or equal to 4.

In operation 860, the electronic device may obtain a digital map included in a target area around a reference position. Herein, the digital map may include at least one of a road network of the target area, a position of at least one building, a shape of the at least one building, a height of the at least one building, or terrain information, or any combination thereof.

In operation 870, the electronic device may determine whether each of the valid satellites meets an LOS. In detail, the electronic device may identify candidate satellites from the valid satellites, based on coordinates obtained by projecting positions of the valid satellites and the reference position in a first direction and the digital map, in a 3D space including the positions of the valid satellites and the reference position. The electronic device may identify at least one target satellite meeting the LOS at the reference position, based on coordinates obtained by projecting positions of the candidate satellites and the reference position in a second direction different from the first direction and the digital map, in the 3D space.

Figure 9:
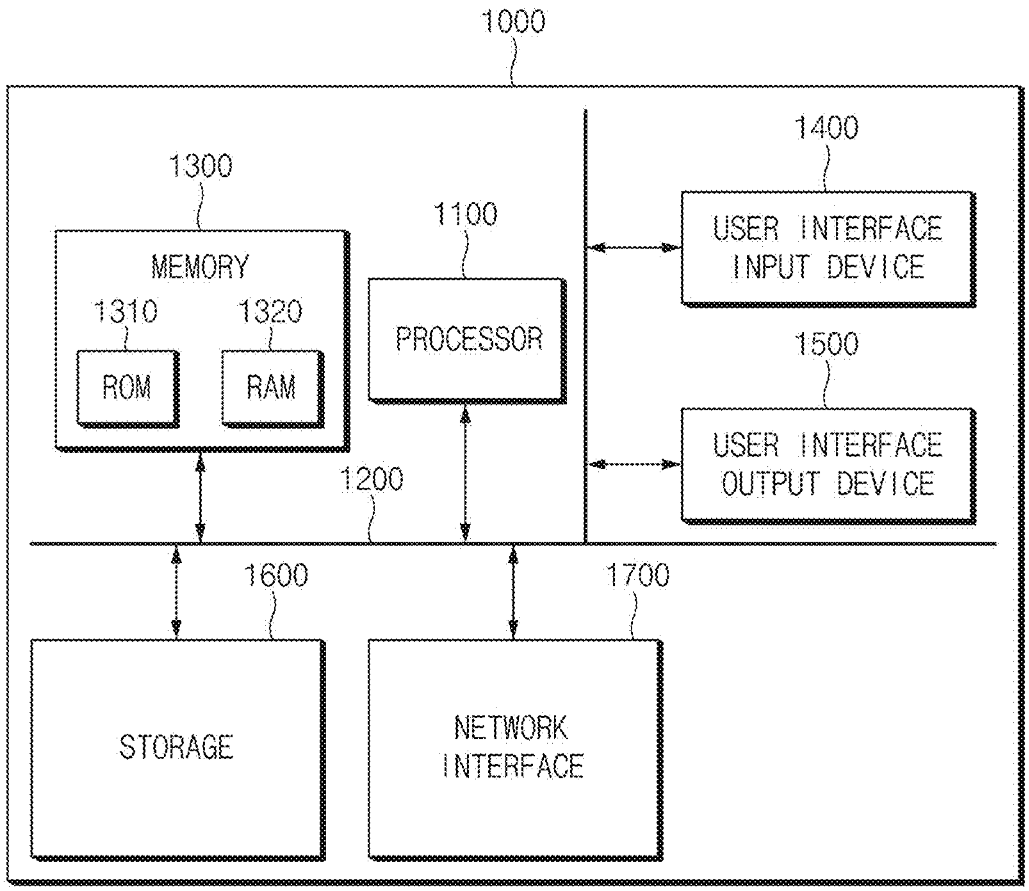
FIG. 9 is a drawing illustrating a computing system associated with an electronic device or a method for identifying a satellite according to an embodiment of the present disclosure.

FIG. 9 is a drawing illustrating a computing system associated with an electronic device or a method for identifying a satellite according to an embodiment of the present disclosure.

Referring to FIG. 9, a computing system 1000 about the electronic device or the method for identifying the satellite may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer means and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the embodiments are described with reference to restricted drawings, it may be obviously to one skilled in the art that the embodiments are variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of effects of the electronic device and the method for identifying the satellite according to an embodiment of the present disclosure.

According to at least one of embodiments of the present disclosure, the electronic device may ensure the effectiveness of satellites used for trilateration for obtaining a reference position at which the GNSS signal is received, thus minimizing a GNSS signal occlusion phenomenon which occurs in a city center by means of a low-cost GNSS receiver.

Furthermore, according to at least one of embodiments of the present disclosure, the electronic device may obtain candidate satellites based on coordinates obtained by projecting positions of valid satellites and a reference position at which the GNSS signal is received in a first direction and a digital map to obtain satellites in which the GNSS signal is occluded by the wall of the building, thus identifying the GNSS signal occlusion phenomenon of the satellites once more.

Furthermore, according to at least one of embodiments of the present disclosure, the electronic device may obtain satellites meeting a line of sight (LOS) based on coordinates obtained by projecting positions of the candidate satellites and the reference position at which the GNSS signal is received in a second direction orthogonal to the first direction and the digital map, thus minimizing the GNSS signal occlusion phenomenon which occurs in a city center by means of the low-cost GNSS receiver and simultaneously minimizing a navigation guidance error of the vehicle which is operating in the city center.

In addition, various effects ascertained directly or indirectly through the present disclosure may be provided.

Therefore, other implements, other embodiments, and equivalents to claims are within the scope of the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

The invention claimed is:

1. An electronic device, comprising:

a memory storing computer-executable instructions; and at least one processor configured to access the memory and execute the instructions, wherein the instructions comprise:

filtering received global navigational satellite system (GNSS) signals to identify valid satellites, based on receiving the GNSS signals from a plurality of satellites;

obtaining a digital map of a predetermined target area around a reference position at which the GNSS signals are received;

identifying candidate satellites from the valid satellites, based on coordinates obtained by projecting positions of the valid satellites and the reference position in a first direction and the digital map, in a three-dimensional (3D) space including the positions of the valid satellites and the reference position; and identifying at least one target satellite meeting a line of sight (LOS) at the reference position, based on coordinates obtained by projecting positions of the candidate satellites and the reference position in a second direction different from the first direction and the digital map, in the 3D space.

2. The electronic device of claim 1, wherein the instructions comprise:

obtaining fault signals based on at least one of a clock delay of each of the GNSS signals, an orbit error, or noise, or any combination thereof; and obtaining signals greater than predetermined signal intensity among signals except for the fault signals among the GNSS signals to identify the valid satellites.

3. The electronic device of claim 1, wherein the instructions comprise:

repeatedly identifying the valid satellites, based on a predetermined number for trilateration.

4. The electronic device of claim 1, wherein the instructions comprise:

obtaining at least one of: (i) a road network of the predetermined target area, (ii) a position of at least one building, (iii) a shape of the at least one building, (iv) a height of the at least one building, or (v) terrain information, or any combination thereof from the digital map.

5. The electronic device of claim 1, wherein the instructions comprise:

obtaining first boundary lines of at least one building included in the predetermined target area associated with the first direction and second boundary lines of the at least one building associated with the second direction from the digital map, based on obtaining the digital map of the predetermined target area.

6. The electronic device of claim 5, wherein the instructions comprise:

projecting the positions of the valid satellites in the first direction to obtain a first satellite coordinate group;

projecting the reference position in the first direction to obtain first reference coordinates;

obtaining satellites corresponding to first segments intersecting with the first boundary lines among first segments generated by connecting the first reference coordinates with each of coordinates included in the first satellite coordinate group; and extracting the satellites corresponding to the first segments intersecting with the first boundary lines from the valid satellites to identify the candidate satellites.

7. The electronic device of claim 6, wherein the instructions comprise:

projecting the positions of the candidate satellites in the first direction to obtain a candidate satellite group;

connecting the first reference coordinates with each of coordinates included in the candidate satellite group to generate candidate segments; and obtaining a distance between each of intersection coordinates at which the candidate segments and the first boundary lines intersect with each other and the first reference coordinates as a candidate distance of each of the candidate satellites.

8. The electronic device of claim 7, wherein the instructions comprise:

selecting any one of the candidate satellites as a temporary satellite which is a target for determining the LOS;

projecting a position of the temporary satellite in the second direction to obtain second satellite coordinates;

projecting the reference position in the second direction to obtain second reference coordinates; and obtaining an elevation angle of the temporary satellite, based on coordinates corresponding to a foot of perpendicular drawn on a plane perpendicular to the first direction in the second satellite coordinates, the second satellite coordinates, and the second reference coordinates.

9. The electronic device of claim 8, wherein the instructions comprise:

obtaining a first calculation value, based on a trigonometric function of the candidate distance and the elevation angle of the temporary satellite;

identifying at least one intersection coordinates at which a second segment generated by connecting the second reference coordinates with the second satellite coordinates intersect with the second boundary lines; and obtaining a second calculation value capable of indicating a height of the building from the digital map, based on coordinates close to the second reference coordinates among the identified at least one intersection coordinates.

10. The electronic device of claim 9, wherein the instructions comprise:

identifying the temporary satellite as the target satellite, based on the first calculation value and the second calculation value.

11. A method for identifying a satellite, the method comprising:

filtering received global navigational satellite system (GNSS) signals to identify valid satellites, based on receiving the GNSS signals from a plurality of satellites;

obtaining a digital map of a predetermined target area around a reference position at which the GNSS signals are received;

identifying candidate satellites from the valid satellites, based on coordinates obtained by projecting positions of the valid satellites and the reference position in a first direction and the digital map, in a three-dimensional (3D) space including the positions of the valid satellites and the reference position; and identifying at least one target satellite meeting a line of sight (LOS) at the reference position, based on coordinates obtained by projecting positions of the candidate satellites and the reference position in a second direction different from the first direction and the digital map, in the 3D space.

12. The method of claim 11, wherein the identifying of the valid satellites includes:

obtaining fault signals based on at least one of a clock delay of each of the GNSS signals, an orbit error, or noise, or any combination thereof; and obtaining signals greater than predetermined signal intensity among signals except for the fault signals among the GNSS signals to identify the valid satellites.

13. The method of claim 11, wherein the identifying of the valid satellites includes:

repeatedly performing identifying the valid satellites, based on a predetermined number for trilateration.

14. The method of claim 11, wherein the obtaining of the digital map of the target area includes:

obtaining at least one of a road network of the target area, a position of at least one building, a shape of the at least one building, a height of the at least one building, or terrain information, or any combination thereof from the digital map.

15. The method of claim 11, further comprising:

obtaining first boundary lines of at least one building included in the target area associated with the first direction and second boundary lines of the at least one building associated with the second direction from the digital map, based on obtaining the digital map of the target area.

16. The method of claim 15, further comprising:

projecting the positions of the valid satellites in the first direction to obtain a first satellite coordinate group;

projecting the reference position in the first direction to obtain first reference coordinates;

obtaining satellites corresponding to first segments intersecting with the first boundary lines among first segments generated by connecting the first reference coordinates with each of coordinates included in the first satellite coordinate group; and extracting the satellites corresponding to the first segments intersecting with the first boundary lines from the valid satellites to identify the candidate satellites.

17. The method of claim 16, further comprising:

projecting the positions of the candidate satellites in the first direction to obtain a candidate satellite group;

connecting the first reference coordinates with each of coordinates included in the candidate satellite group to generate candidate segments; and obtaining a distance between each of intersection coordinates at which the candidate segments and the first boundary lines intersect with each other and the first reference coordinates as a candidate distance of each of the candidate satellites.

18. The method of claim 17, further comprising:

selecting any one of the candidate satellites as a temporary satellite which is a target for determining the LOS;

projecting a position of the temporary satellite in the second direction to obtain second satellite coordinates;

projecting the reference position in the second direction to obtain second reference coordinates; and obtaining an elevation angle of the temporary satellite, based on coordinates corresponding to a foot of perpendicular drawn on a plane perpendicular to the first direction in the second satellite coordinates, the second satellite coordinates, and the second reference coordinates.

19. The method of claim 18, further comprising:

obtaining a first calculation value, based on a trigonometric function of the candidate distance and the elevation angle of the temporary satellite;

identifying at least one intersection coordinates at which a second segment generated by connecting the second reference coordinates with the second satellite coordinates intersect with the second boundary lines; and obtaining a second calculation value capable of indicating a height of the building from the digital map, based on coordinates close to the second reference coordinates among the identified at least one intersection coordinates.

20. The method of claim 19, further comprising:

identifying the temporary satellite as the target satellite, based on the first calculation value and the second calculation value.

* * * * *